United States Patent

[11] 3,613,849

[72] Inventor Karl Heinz Pape
 Kleinenbremen, Germany
[21] Appl. No. 23,280
[22] Filed Mar. 27, 1970
[45] Patented Oct. 19, 1971
[73] Assignee Maschinenfabrik Hans Lenze KG
 Bosingfeld, Lippe, Germany
[32] Priority Apr. 21, 1969
[33] Germany
[31] P 19 20 128.6

[54] AUTOMATIC ADJUSTING DEVICE FOR CLUTCHES AND BRAKES
 4 Claims, 2 Drawing Figs.
[52] U.S. Cl. .................................................. 192/84 B,
 188/71.8, 188/196 P, 192/111 A
[51] Int. Cl. ........................................................F16d 27/08,
 F16d 13/75, F16d 65/52
[50] Field of Search........................................ 192/70.25,
 70.26, 84 B, 111 A; 188/71.8, 196 P

[56] References Cited
 UNITED STATES PATENTS
 3,394,787 7/1968 Fitzgerald.................... 192/111 A
 3,458,022 7/1969 Reiff.............................. 192/111 A
 3,485,330 12/1969 Reiff.............................. 192/111 A Primary Examiner—Allan D. Herrmann
Attorney—Edwin E. Greigg ABSTRACT: In a brake or clutch with electromagnetic release, an automatic-adjusting device, compensating for the wear of the friction elements, includes an armature and an adjacent magnetic core both axially slidable on guiding bolts towards and away from said friction elements, said adjusting device further includes locking elements which permit said magnetic core to slide freely on said guide bolts only towards said armature and which permit said armature to slide freely on said guide bolt towards said friction elements, but to slide towards said magnetic core only the distance of the armature stroke.

PATENTED OCT 19 1971　　3,613,849

Inventor
Karl H. Pape
by
Edwin E. Greigg

AUTOMATIC ADJUSTING DEVICE FOR CLUTCHES AND BRAKES

BACKGROUND OF THE INVENTION

This invention relates to friction-type clutches and brakes including electromagnetically operated disengagement means wherein the armature is brought into direct contact with the friction elements associated with a rotor.

In known clutches or brakes of this type the disengagement is effected by a solenoid disposed in an axially stationary component (magnetic core) of the clutch or brake. The magnetic field generated by the solenoid, overcoming the force of the clutch or brake spring, attracts the axially displaceable armature across an airgap and thus removes the pressure exerted by said spring on the friction elements.

It is a disadvantage of the aforenamed structures that, as the work faces of the friction elements wear away, the airgap between the movable armature and the stationary magnetic core increases. Since the magnetic flux has to bridge the airgap beyond a certain wear, the airgap becomes so large that the magnetic field is no longer capable of attracting the armature. This occurs when the airgap has a dimension of between 0.3–1.0 mm. depending upon the dimensions of the clutch or brake and the design of the magnetic circuit. The total possible wear of the friction elements, however, is 5–20 mm. depending upon the dimension of the clutch or brake mechanism. This means that the mechanism, during its entire lifetime, has to be adjusted approximately 10 to 20 times. If no timely adjustment is made, damages and even total destruction of the brake or clutch may occur.

It is further disadvantageous that the magnetic field has to be designed by taking into account a maximum permissible airgap occurring in view of the aforenoted wear of the friction elements. Thereby the maximum permissible spring preload is also given which determines the maximum torque or braking moment to be generated.

It is also a disadvantage of known structures that, as the airgap increases, the switching times vary substantially which leads to an uneven switching operation. Short and accurately timed switching periods are essential in automated systems of fixed cycle operations performing a large number of switching steps in a short period of time.

OBJECT, SUMMARY AND ADVANTAGES OF THE INVENTION

It is an object of the invention to provide an automatic-adjusting device for clutched and brakes of the type outlined hereinabove wherein the discussed disadvantages are eliminated.

Briefly stated, according to the invention, both the armature and the magnetic core are axially displaceably guided by bolts supported by a clutch part or a stationary brake component, and both the armature and the core are supported by unidirectionally locking resilient elements disposed on the guiding bolts. One of the locking elements is disposed in a cavity which is provided in the armature and which is by the armature stroke deeper than the axial dimension of the locking element. Upon a wear of the friction faces, the armature, urged by the coupling or brake spring, is moved, in addition to the armature stroke, a distance equalling the extent of the wear. During the return motion of the armature, however, the latter, by virtue of the locking elements, is permitted to travel only the distance corresponding to the armature stroke. Upon stoppage, the armature forms an abutment for the magnetic core which, by virtue of the magnetic field, is attracted to the armature.

It is an advantage of the invention that during the entire lifetime of the clutch or the brake, that is, up to the moment of maximum permissible wear, the airgap set during the installation is maintained constant between the magnetic core and the armature.

The invention will be better understood, as well as further objects and advantages will become more apparent, from the ensuing detailed specification of two exemplary embodiments taken in conjunction with the drawing.

DESCRIPTION OF THE EMBODIMENTS

Figure 1:
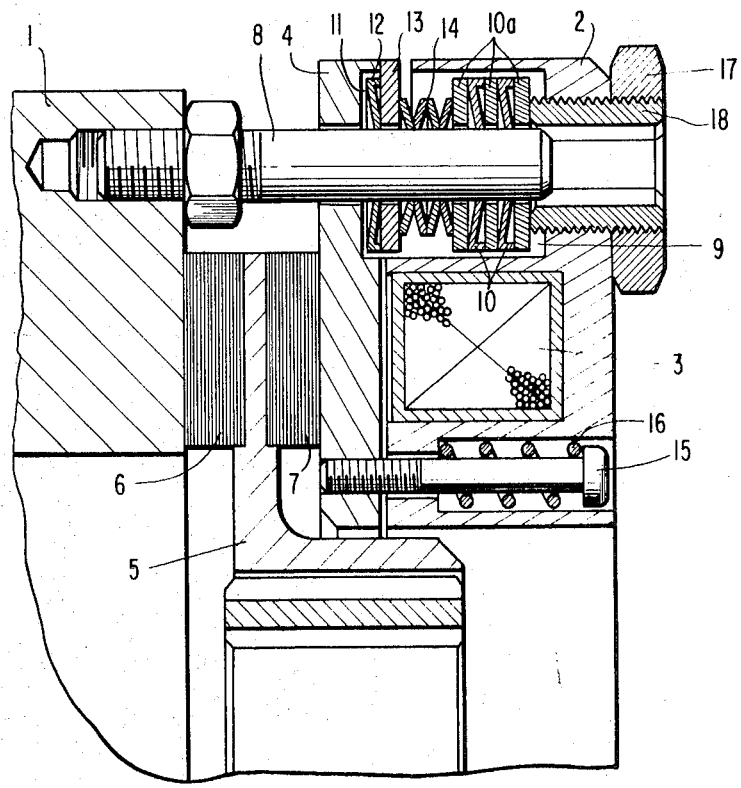
FIG. 1 is an axial sectional view of a first embodiment of the invention.

Turning now to FIG. 1, the spring-operated brake shown therein comprises a stationary brake flange 1, a magnetic core 2, a solenoid 3 disposed in the magnetic core 2, an armature 4 and a rotor 5 which is adapted to be attached to a shaft to be braked (not shown) and which carries annular friction elements 6 and 7. The rotor is mounted in such a manner that it is axially displaceable with respect to said shaft, but is constrained to rotate therewith as a unit.

To the brake flange 1 there are secured a plurality of bolts 8 which serve as axial guides for the axially displaceable armature 4 and magnetic core 2, and which are disposed about the brake axis in a circular array. To the bolts 8 there are secured two resilient locking elements 10 disposed between support discs 10a in a cavity 9 of the magnetic core 2. A further resilient locking element 12 is associated with each bolt 8 and disposed in a cavity 11 of the armature 4 covered by a support or closure disc 13. The depth of the cavity 11 is by the required armature stroke (for example, 0.5 mm.) deeper than the axial dimension of the spring element 12. The spring elements are serrated rings or the like which engage the associated bolt 8 in such a manner that, when a force is exerted on said elements 10, 12 in the direction of the brake flange 1, they are capable of sliding with respect to bolt 8, whereas, upon a pressure in the opposite direction, they securely lock on the bolt 8. On the bolts 8, between the spring elements 10 and 12, there are arranged brake springs 14. By means of a setting screw 17 and counternut 18 held in the magnetic core 2, the preload of the brake springs 14 may be adjusted. The magnetic core 2 is resiliently supported adjacent the armature 4 by means of a bolt 15 loaded by a spring 16.

To explain the operation of the automatic-adjusting device, it is assumed that each friction disc 6 and 7 is worn 0.2 mm. Assuming an axially not displaceable magnetic core 2, the brake springs 14 would still be capable of shifting the armature 4 to such an extent as to provide frictional contact between the armature 4 and friction disc 7 and between the friction disc 6 and brake flange 1. Upon such an occurrence, however, the airgap between the magnetic core 2 and the armature 4 would be by the total wear (0.4 mm.) greater than the original airgap of 0.5 mm. The airgap, however, is to remain unchanged despite the wear of the friction elements 6 and 7. This desired result is obtained by virtue of the inventive structure in a manner now to be described.

When the solenoid 3 is in a deenergized condition, in case of a total wear of 0.4 mm., the armature 4 is advanced towards the brake flange 1 by spring 14 through a distance equalling the width of the airgap (0.5 mm.) plus the thickness of the wear (0.4 mm.). The displacement of the armature 4 with respect to bolt 8 is permitted by the spring element 12 since, in this direction, the latter engages the former in a nonlocking manner. During the displacement of armature 4 with respect to bolt 8, the spring element 12 lies against the inner face of support or closure disc 13. The brake spring 14 engages, with one end, the outer face of the closure disc 13, and, with the other end, the locking elements 10 which, because of the spring force exerted in that particular direction, lock on the bolt 8.

Upon energization of the solenoid 3, the generated electromagnetic field, overcoming the force of spring 14, causes a displacement of armature 4 away from friction discs 6, 7. During such displacement, the locking element 12 remains stationary on bolt 8. Since the cavity 11 is by the required armature stroke (0.5 mm.) deeper than the axial dimension of the locking element 12, after a displacement of 0.5 mm. of the armature 4 away from the friction discs 6, 7, the base of cavity 11 engages the locking element 12. A force exerted on the latter in that direction causes a locking interengagement with the bolt 8. As a result, the armature 4 is prevented from moving further. The magnetic core 2, under the effect of the electromagnetic field, moves towards the armature 4, which, held by the locking element 12, forms an abutment for the magnetic core 2. It is to be noted that the aforenoted movement of magnetic core 2 on bolt 8 is permitted by spring elements 10, since they do not lock in that direction.

Upon deenergization of solenoid 3, the electromagnetic field is removed and, as a result, the armature 4 is displaced by the spring 14 0.5 mm. into engagement with friction disc 7. At the same time, the magnetic core 2 remains stationary due to the locking engagement of spring elements 10 with bolt 8. It is thus seen that in this position of the brake mechanism, the required airgap of 0.5 mm. between armature 4 and magnetic core 2 is automatically reestablished and the brake springs 14 have their originally set preload.

It is to be stressed that the aforegiven numerical value of 0.4 mm. corresponding to the total wear is exemplary only. It is apparent from the foregoing description that the automatic adjustment, that is, the correction, of the airgap is performed in a continuous manner even upon the slightest extent of wear.

Figure 2:
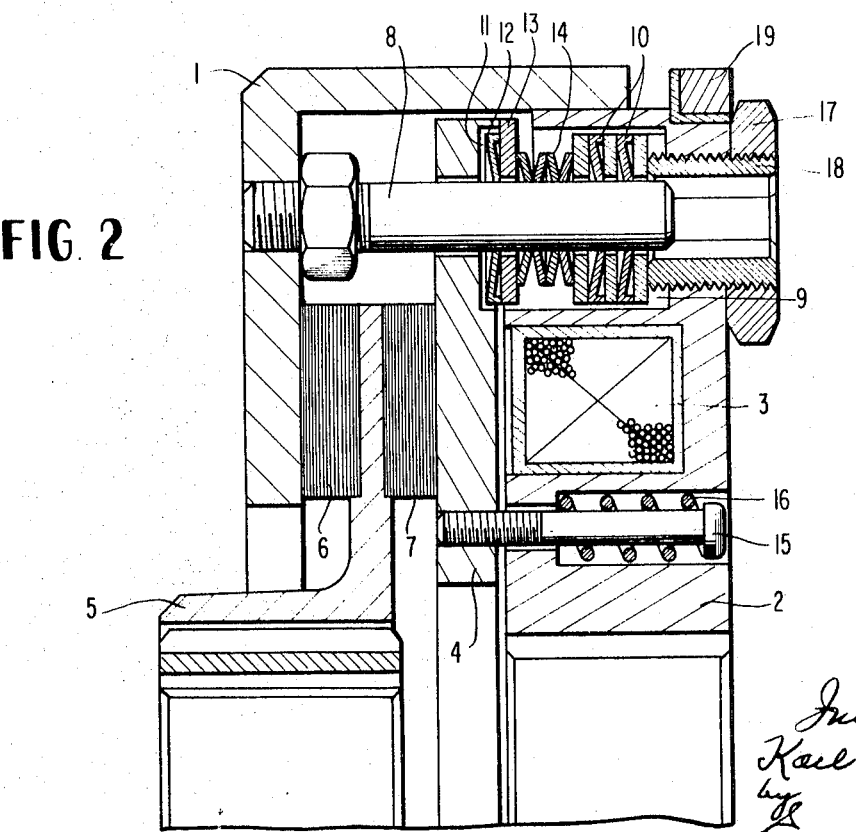
FIG. 2 is an axial sectional view of a second embodiment of the invention.

Turning now to FIG. 2, the embodiment therein shows a spring-operated clutch which differs from the embodiment according to FIG. 1 merely in that the axially displaceable magnetic core 2 is fixedly keyed to the driving shaft (not shown) and the magnetic core 2 rotates with the housing 1 secured thereto. The current is supplied to the solenoid 3 by means of a slipring 19. The bolts 8 are fixedly held in the rotating housing 1.

The operation of the automatic adjustment mechanism is identical to that described in connection with the first embodiment.

What is claimed is:

1. In an adjusting device associated with a clutch or brake mechanism to compensate for the wear of friction faces, said mechanism is of the known type having (A) a rotor, (B) friction elements associated with said rotor, (C) a solenoid, (D) a magnetic core receiving said solenoid, (E) an armature disposed and arbitrarily movable between said magnetic core and said friction elements, said armature movable away from said friction elements by a magnetic field generated by said solenoid and (F) resilient means urging said armature into engagement with said friction elements, the improvement comprising,
   A. at least one stationarily held guiding bolt passing through said armature and said magnetic core,
   B. a first locking element mounted on said bolt and disposed in said magnetic core, said first locking element permitting displacement of said magnetic core on said guiding bolt solely towards said armature and
   C. a second locking element mounted on said bolt and disposed in said armature, said second locking element permitting displacement of said armature on said guiding bolt towards said magnetic core solely through a distance corresponding to a desired airgap to be maintained between said armature and said magnetic core in a deenergized condition of said solenoid, said second locking element permitting displacement of said armature on said guiding bolt towards said friction elements.

2. An improvement as defined in claim 1, including a spring, forming said resilient means, disposed about said guiding bolt between said first and second locking elements.

3. An improvement as defined in claim 1, including a cavity formed in said armature and receiving said second locking element, said cavity is by the width of said desired airgap deeper than the axial dimension of said second locking element.

4. An improvement as defined in claim 1, including support bolt means moveably securing said armature to said magnetic core.